H. JAM.
COMBINED DRILL AND UNDERREAMER FOR WELLS.
APPLICATION FILED NOV. 25, 1910.
1,002,152.
Patented Aug. 29, 1911.
2 SHEETS—SHEET 1.
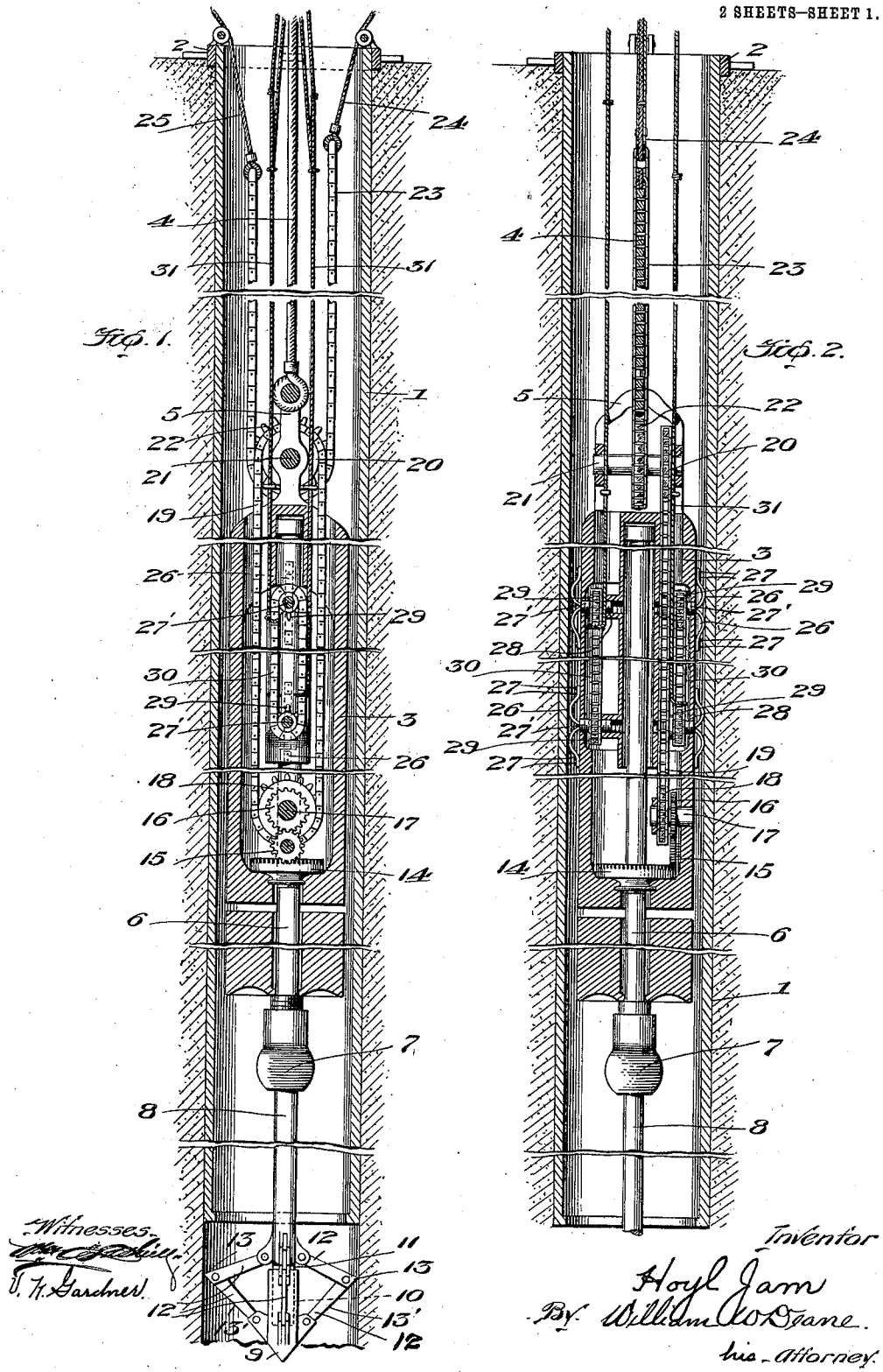

H. JAM.
COMBINED DRILL AND UNDERREAMER FOR WELLS.
APPLICATION FILED NOV. 25, 1910.

1,002,152.

Patented Aug. 29, 1911.
2 SHEETS—SHEET 2.

UNITED STATES PATENT OFFICE.

HOYL JAM, OF BAKERSFIELD, CALIFORNIA.

COMBINED DRILL AND UNDERREAMER FOR WELLS.

1,002,152. Specification of Letters Patent. Patented Aug. 29, 1911.

Application filed November 25, 1910. Serial No. 594,164.

*To all whom it may concern:*

Be it known that I, HOYL JAM, subject of the Emperor of China, residing at Bakersfield, in the county of Kern and State of California, have invented certain new and useful Improvements in Combined Drills and Underreamers for Wells, of which the following is a specification.

This invention relates to combined drills and underreamers for wells.

The present invention has for its objects the provision of a combined drill head and under reamer which will be adapted to expand or to contract, novel means for turning the spindle and chuck of a drilling tool while it is being reciprocated, and novel means for exerting any desired frictional engagement between the body of the drill and the well casing so that the drilling apparatus may be secured at any desired depth and the drill or under reamer then operated.

The invention contemplates the provision of a drill which can be expanded to operate as an under reamer; the provision of means for turning the drill spindle by the employment of flexible connections and coöperating devices regardless of the depth at which the tool is working; and the provision of spring friction clamps and flexible connections for operating them from the mouth of the well to cause them to bear against the sides of the well casing, as will appear more fully hereinafter.

Figure 3:
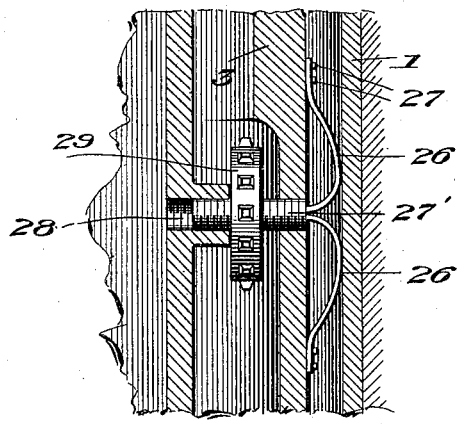
Figure 4:
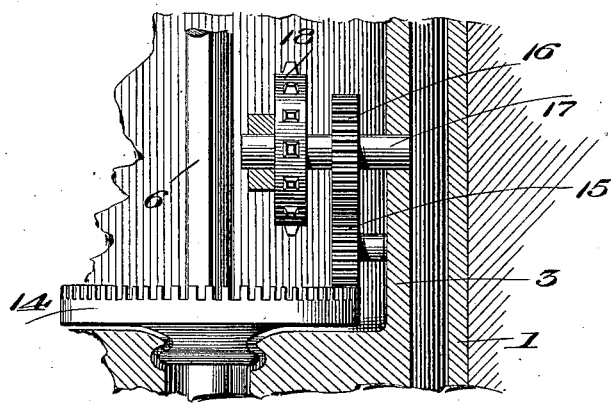

In the accompanying drawings:—Figure 1 is a section through a cased well showing my apparatus in position therein with the tool ready for use as an under reamer; Fig. 2 is a view at right angles to Fig. 1; Fig. 3, a detail section showing one of the spring clamps; Fig. 4, a detail section showing the gearing for turning the drill and under reamer.

The casing of the well is shown at 1, the support therefor at the mouth of the well being indicated at 2.

The body 3 of the apparatus may be made as heavy as desired to give weight to the drill and it is raised and lowered, as usual, by a cable 4 connected to a yoke 5. The drill stem 6 has any suitable chuck 7 for holding the shank 8 of the drill which is of the form shown in Fig. 1, consisting of a conical or pyramidal point 9 having a socket 10 in which is slidably received the lower end 11 of the shank 8. Toggle levers 12 connect the point 9 with the shank 8 above the socket 10 and are provided with under reaming points 13 and edges 13′. Secured to the drill stem 6 is a crown or other gear 14 which is in mesh with a gear 15 driven by another gear 16 carried by shaft 17 which is suitably journaled and carries a sprocket wheel 18 (Fig. 4). The sprocket wheel 18 is connected by an endless sprocket chain 19 to a sprocket wheel 20 on a shaft 21 carried by the yoke 5 and carrying another sprocket wheel 22 which has engaged therewith a sprocket chain 23, the upper ends of which (Fig. 1) are connected to cables 24 and 25, leading to the mouth of the well for operation by suitable means. By pulling on cable 24 or on cable 25, the shaft 21 is turned and so is the shaft 17 which causes the drill stem 6 to be turned and thus turns the drill and under reamer so that it strikes at all points of the circle of the well as it is reciprocated, thus doing away with the necessity of giving the cable 4 a hitch or turn from time to time.

Spring clamps (Figs. 2 and 3) 26 are secured at 27 to the body 3 and are bowed in such fashion that they may be made to bear against the well casing 1. These springs bear against screws 27′ which are threaded into the body at 28 and carry sprocket wheels 29. The clamps are arranged in pairs on opposite sides of the body, the sprocket wheels of each pair being connected by an endless sprocket chain 30 so that the clamps may be made to simultaneously expand. To the respective sprocket chains 30 at different points thereof are connected cables 31. In each instance pulling on one cable will move the sprocket chain in one direction, and on pulling the other chain it will be moved in the opposite direction so that the spring clamps may be pressed outwardly or released. By operating the spring clamps the body may be clamped at any point in the well casing for operation of the under reamer thereat.

Having thus described my invention, what I claim as new and desire to secure by Letters Patent, is:—

In a drilling apparatus, the combination with a body, and a drill or the like carried thereby, of spring members arranged for joint operation and carried by the body so as to be adapted to be forced outwardly to engage the well casing, screw devices for forcing said spring members against the well casing, sprocket wheels coöperating with said screw devices, sprocket chains coöperating with the sprocket wheels, and flexible connections leading from the sprocket chains to the mouth of the well, whereby said chains may be moved.

In testimony whereof I affix my signature in presence of two witnesses.

HOYL JAM.

Witnesses:
A. T. LIGHTNER,
S. S. HUNT.

Copies of this patent may be obtained for five cents each, by addressing the "Commissioner of Patents, Washington, D. C."